United States Patent [19]

Nolan et al.

[11] 3,861,240

[45] Jan. 21, 1975

[54] MULTIPLE SPEED RANGE HYDROMECHANICAL TRANSMISSION

[75] Inventors: John M. Nolan; Bradley O. Reed, both of Pittsfield, Mass.

[73] Assignee: General Electric Company, Pittsfield, Mass.

[22] Filed: Mar. 2, 1973

[21] Appl. No.: 337,384

[52] U.S. Cl. ............................ 74/687, 74/720.5
[51] Int. Cl. .................... F16h 47/04, F16h 37/06
[58] Field of Search ...................... 74/687, 720.5

[56] References Cited
UNITED STATES PATENTS

| | | | |
|---|---|---|---|
| 3,433,095 | 3/1969 | Tuck | 74/687 |
| 3,455,183 | 7/1969 | Orshansky, Jr. | 74/687 |
| 3,470,769 | 10/1969 | Livezey | 74/687 X |
| 3,489,036 | 1/1970 | Cockrell et al. | 74/687 |
| 3,534,632 | 10/1970 | Smith | 74/687 |
| 3,597,997 | 8/1971 | Phillips | 74/687 |
| 3,626,787 | 12/1971 | Singer | 74/687 |
| 3,763,718 | 10/1973 | Tipping | 74/687 |

Primary Examiner—Samuel Scott
Assistant Examiner—Lance W. Chandler
Attorney, Agent, or Firm—Francis K. Richwine

[57] ABSTRACT

An infinitely variable transmission including a first speed range, a second speed range, and a third speed range. Planetary gearing is used in combination with a plurality of clutches to combine the speeds and torques of a hydraulic assembly within the transmission and the input shaft thereof. The "stepless" quality of an infinitely variable transmission is attained with an increased stall torque and gear ratio coverage.

7 Claims, 2 Drawing Figures

PATENTED JAN 21 1975

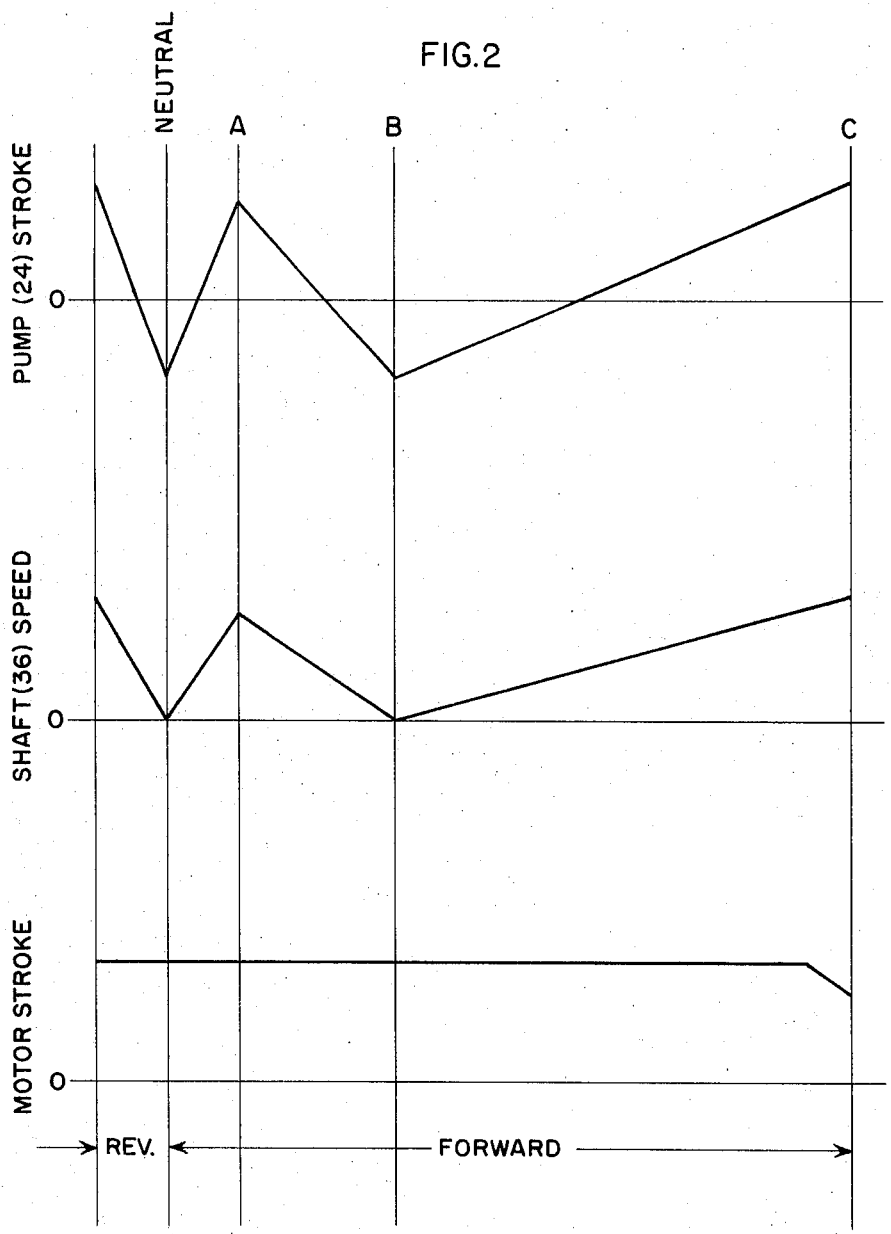

MULTIPLE SPEED RANGE HYDROMECHANICAL TRANSMISSION

BACKGROUND OF THE INVENTION

The present invention relates to a hydromechanical transmission of the infinitely variable type for use in driving heavy vehicles over a wide range of speeds.

The prior art has recognized the desirability of an infinitely variable transmission as applied to the driving of a self-propelled vehicle. By utilization of an infinitely variable transmission, the output speed of the vehicle can be varied from zero to some upper limit and not be subjected to "step" changes in speed as encountered in a discreet "change of gears" situation.

The prior art includes infinitely variable transmissions which can be used in driving heavy motor vehicles. Such a structure is described in U.S. Pat. No. 3,489,036-Cockrell et al., assigned to the assignee of the present invention, and wherein the transmission structure is operable over a limited speed range for movement of a driven vehicle.

A problem is encountered with such prior art structures when larger vehicles demanding higher torques and a wider coverage of gear ratios are designed to employ transmissions of the infinitely variable type. At a certain operational level, it becomes impractical merely to increase the size of the components of a transmission or to decrease gear ratios to provide greater torque (since the range of speeds available would also be necessarily decreased). In addition, it has been common in prior art hydromechanical transmissions to apply the same torque ratio between the included hydrostatic transmission and the output in two or more forward ranges which are offset in speed range only by stepped gear ratios.

Accordingly, it is an object of the present invention to provide an infinitely variable transmission capable of sustaining increased loading over an increased gear ratio range as compared to prior art transmissions of the same type.

Another object of the present invention is to increase the torque capability and speed range of an infinitely variable transmission without materially increasing the size of components over those used in prior art infinitely variable transmissions.

Other objects and advantages of the present invention will be apparent upon reading the specification of the invention herein set forth.

SUMMARY OF THE INVENTION

Briefly, the present invention provides an infinitely variable split torque transmission of the hydromechanical type which provides a different and distinct torque ratio between the included hydrostatic transmission and the output in each forward range. For propulsion in one direction, one branch of the input portion of the transmission drives a hydraulic pump-motor assembly, the output of which drives the ring gear of a set of planetary gearing. Another branch of the input shaft drives the sun gear of the same planetary gearing. The planet carrier of the planetary gearing is in driving connection with an intermediate shaft. A first speed range clutch assembly is driven by the intermediate shaft, the output of which is in direct geared connection with the output shaft of the transmission. The output of the hydraulic motor is varied in speed to correspondingly drive the intermediate shaft and necessarily the output shaft from zero speed to a maximum rotational speed in the first speed range.

A second speed range clutch assembly is also driven at its input by the intermediate shaft. The operational characteristics of the transmission are substantially identical at the maximum speed of the first speed range and the minimum speed of the second speed range to permit effecting a smooth transition from the first speed range to the second speed range. The output of the second speed range clutch assembly drives a ring gear which is part of another planetary set of gearing. The sun gear of the second planetary set of gearing is driven directly by the input shaft of the transmission. The output shaft is driven by the planet carrier of the second set of planetary gearing. Variation in the speed of the output of the hydraulic motor varies the driven speed of the ring gear of the second planetary set of gearing and hence varies the net speed of the output shaft between the upper limit of the first speed range and the lower limit of a third speed range.

A third speed range clutch assembly is also driven by the intermediate shaft upon transition from the maximum speed of the second speed range to the lowest speed of the third speed range. The third speed range clutch assembly also drives the ring gear of the second planetary set of gearing in a manner to vary the speed of the output shaft at a higher rotational speed than during the second speed range.

A reverse clutch assembly is provided for a reverse mode of operation of the transmission. It is operationally driven by the intermediate shaft and is functionally similar in operation to the first speed range clutch assembly except for the reversing effect imparted to the output shaft.

DESCRIPTION OF THE DRAWINGS

The subject matter which is regarded as the invention is particularly pointed out and distinctly pointed out in the claims set forth at the end of the specification. The invention, however, both as to organization and method of practice, may be best understood by reference to the following description taken in conjunction with the accompanying drawings in which:

FIG. 2 is a graphical representation of the stroke of the hydraulic pump and motor and the corresponding speed of the intermediate shaft as the transmission varies from maximum reverse speed to maximum speed in the third speed range.

DETAILED DESCRIPTION OF A PREFERRED EMBODIMENT

Figure 1:
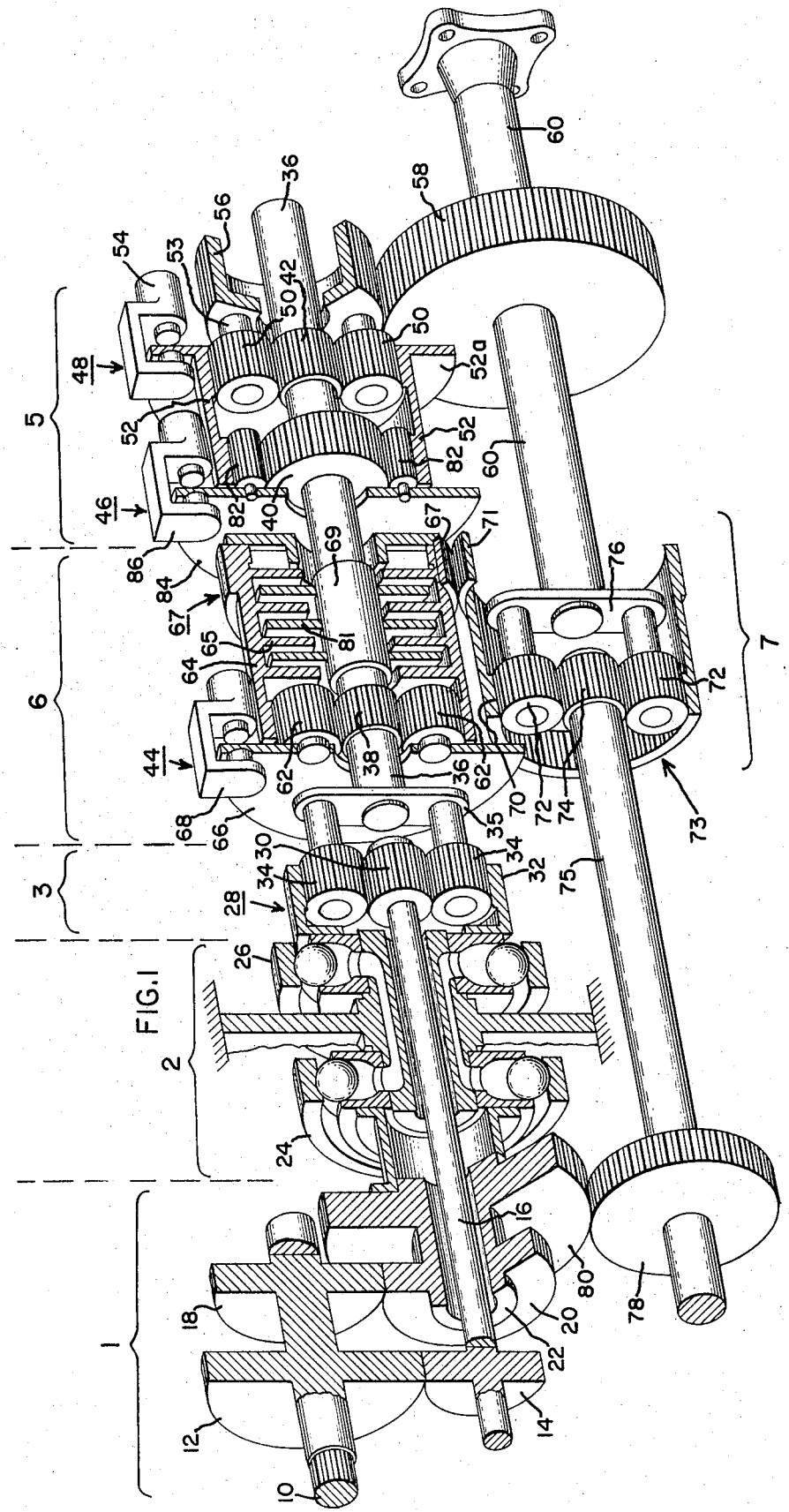
FIG. 1 is an isometric view of the transmission in section depicting all of the operational components thereof.

Referring to FIG. 1 of the drawings, shaft 10 represents a means for coupling the input from a prime mover (not shown but well known in the art) to the transmission to be described. Gear 12 fixedly secured on shaft 10, engages and drives gear 14 on shaft 16. A gear 18 is also affixed to shaft 10 and is in driving connection with gear 20, which gear 20 is affixed to a shaft 22. Shaft 22 concentrically surrounds shaft 16 and is independently rotatable with respect to shaft 16. For convenience of reference, this entire power input arrangement has been given the reference numeral 1 in FIG. 1. One end of shaft 22 terminates at and is connected to the input of a reversible hydraulic pump unit generally indicated as 24 in FIG. 1. The hydraulic pump unit 24 provides for variable displacement and is operatively associated with a reversible hydraulic motor unit 26 to form a hydrostatic transmission 2. The motor unit 26 may also be of the variable displacement variety and is in a closed hydraulic circuit with the pump unit 24. The combination of hydraulic pump and motor units is well known in the prior art. While these units are nominally referred to as being pump and motor units, it should be understood that under certain conditions the functions of the units may be reversed; that is, the motor may act as a pump for supplying power to drive the pump which will then be acting as a motor. Application of ball piston hydraulic pump and motor units to power transmissions like the hydrostatic transmission 2 as used in this invention is fully described in U.S. Pat. Nos. 3,489,036 and 3,650,159, Cockrell et al., and 3,324,740, Lewis et al., assigned to the assignee of the present invention. The above reference fully describes control means associated with the pump and motor units for the reversible transmission of power therebetween whereby the speed and direction of rotation of the output of motor unit 26 can be selectively determined.

A set of differential gearing is generally indicated as 3 in FIG. 1. This differential gearing includes a sun gear 30 which is affixed to and driven by shaft 16. It is to be appreciated that shaft 16 extends axially through the combined hydraulic pump and motor unit structure yet is completely independent therefrom. Sun gear 30 is therefore directly driven by the shaft 10. The differential gearing further includes a ring gear 32 which is directly coupled or driven by the output of the hydraulic motor unit 26. A plurality of planet gears 34, operatively associated with the sun gear 30 and surrounding ring gear 32, are mutually in a driving connection with an intermediate shaft 36.

A less efficient modification of the transmission can be used for many purposes. This modification would omit the differential gear set 3, use only one shaft in lieu of shafts 16 and 22 in the power input train 1 and have the output of hydraulic unit 26 directly connected to drive intermediate shaft 36.

Intermediate shaft 36 is affixed to sun gears 38, 40, and 42 of the respective clutch assemblies 44, 46, and 48. The assembly 48 is more specifically the first speed range clutch of the transmission. A plurality of planet gears 50 are cooperatively disposed between the sun gear 42 and a surrounding ring gear 52. During first speed range operation, a radially extending flange 52a of the ring gear 52 is operated on by braking unit 54. With the ring gear 52 locked in a fixed position, the shafts 53 carrying planet gears 50 provide a driving connection to gear 56 which acts as the carrier for planet gears 50. Gear 56 in turn drives gear 58 wherein the latter is secured to the output shaft 60. This arrangement provides a selectable reduction gear train 5 interconnecting the intermediate shaft 36 and output shaft 60 for low and reverse ranges.

The clutching assembly 44 is operative during second speed range operation. A plurality of planet gears 62 are operatively disposed between sun gear 38 and a surrounding ring gear 64 to form an epicyclic gear set 6. A carrier 66 for the planets 62 extends radially upward into a braking unit 68. During second speed range operation, the planet carrier 66 is engaged by the brake unit 68 and locked in a fixed position. Therefore ring gear 64 is driven solely by sun gear 38 acting through planetaries 62. The external gear 67 on ring gear 64 is in driving connection with an external gear 71 on ring gear 70 which is a part of another epicyclic gear set 7. The ring gear 70 in turn engages a plurality of cooperating planet gears 72 of the epicyclic gear set 7 of gearing 73 which is the second planetary set referred to in the foregoing SUMMARY OF THE INVENTION. The planet gears 72 are also operatively associated with a sun gear 74 with the latter being affixed to shaft 75 and driven thereby. Shaft 75 is driven by gear 78 which in turn is driven by a gear 80 which is a part of the power means 1. Gear 80 is coaxially mounted with gear 20 on shaft 22. As described above, gear 20 is driven by the input gear 18. Therefore, the sun gear 74 is directly driven by shaft 10 through the power drive train input described above. The planet gears 72 are further operatively connected to planet carrier 76 and upon revolution of the planet gears 72, the output shaft 60 is driven through the operative connection of the planet carrier 76. Consequently the output of carrier 76 and shaft 60 is a summation of the inputs of sun gear 74 and ring gear 70, the latter a unique input in this system as controlled by the second speed range assembly 44.

A clutching assembly generally shown as 69 is operative during the third speed range operation of the transmission. The ring gear 64 of the second speed range clutch assembly 44 also surrounds a plurality of splined clutch plates 65 extending radially inward towards the intermediate shaft 36. A corresponding plurality of splined engageable clutch plates 81 are mounted on a hub and extend radially outward from the intermediate shaft 36. During third speed range operation and with second speed range clutch 68 disengaged, the engageable pressure plates 81 are designed to drivingly engage corresponding plates 65 so as to cause all three elements of epicyclic gear set 6 to rotate as a unit to impart rotation from the intermediate shaft 36 directly to the ring gear 64. The ring gear 64 is in driving connection with ring gear 70 through external gear 67 as previously described. Accordingly, second and third ranges are similar in that both are split torque drives combined by the planetary gear set 73 and are different only by the applied gear ratios.

The clutching assembly 46 is utilized during the reverse mode of operation of the transmission. A plurality of planet gears 82 are operatively disposed between sun gear 40 and the surrounding ring gear 52 which is the same ring gear used in the first speed range clutch. In addition, a planet carrier 84 is secured to the planet gears 82. During the reverse mode of operation, the planet carrier 84 is operated on by a braking unit 86 which secures the planet carrier 84 in a fixed position. With brake 86 engaged and brake 54 of the first speed range disengaged, ring gear 52 is being driven by sun gear 40 through planetaries 82 and the motion of ring gear 52 is summed into the resulting motion of planetaries 50 as they are driven by sun gear 42. This arrangement, assuming proper gear ratios, causes a rotation of gear 56 in a direction opposite to its rotation in first speed range.

Prior to considering the several ranges of operation of the transmission "per se," it may be advantageous to consider the interrelationship of certain elements of the overall transmission structure. With a prime mover connected to shaft 10, shaft 10 drives gears 12 and 14, and shaft 16 of the input train 1. Therefore, sun gear 30 attached to shaft 16 rotates at a speed directly proportional to the speed of the input shaft 10. In addition, gear 18 on the input shaft 10 drives gear 20 which gear 20 is affixed to the hollow shaft 22. Shaft 22 serves as the input to the hydraulic pump unit 24. Since the shaft 22 is also driven at a speed in direct proportion to the speed of the input shaft 10, the speed of the input to the hydraulic pump unit 24 and the speed of sun gear 30 are of a fixed proportionn with respect to each other. In our implementation wherein ball-piston hydraulic units are illustrated, the pump unit 24 and corresponding hydraulic motor unit 26 are operatively associated with one another as a hydrostatic transmission 2 as described in detail in U.S. Pat. No. 3,489,036 -Cockrell et al., referred to above. Generically, both units 24 and 26 are similar hydraulic devices, one of which pumps fluid which causes the other to rotate. For the most part, unit 24, which is connected to the input shaft 10, pumps fluid to unit 26 which in turn is connected to ring gear 32. It is to be understood, however, that the output of the hydraulic motor unit 26 and necessarily the ring gear 32 can be driven in either rotational direction by a fixed rotational input to the pump unit 24. The related controls for reversal of the rotational direction of the motor unit 26 are well known in the art and are not deemed necessary for an understanding of the present invention. It is to be further understood that under some operating conditions to be considered later that an affirmative rotational force applied to ring gear 32 by the planet gears 34 could serve as an input to the hydraulic unit 26. In such a situation, the hydraulic unit 26 would be acting as a hydraulic pump and the unit 24 would be serving as a hydraulic motor in response thereto.

A final consideration with respect to the hydraulic units 24 and 26 is that the fluid capacities of each can be varied by various controls well known in the art. In the present invention, it is anticipated that the capacity of only unit 24 will be varied so that the output speed of unit 26 and necessarily the torque transmission capacity of unit 24 can be varied with respect to a fixed rotational speed on shaft 22 which serves as the input to pump 24. Variable capacity of unit 26 is not needed but could be used.

A neutral condition exists when the planet carrier 35 and affixed intermediate shaft 36 are stationary. For this condition to arise, the planetary gears 34 and the carrier 35 must not revolve about shaft 36 but each planetary 34 simply rotates about its own individual axis. This will occur when the speed and direction of the ring gear 32, as determined by the output of the motor unit 26, and the speed of the input driven shaft 16 and sun gear 30 are exactly offset by one another.

Referring to FIG. 1, in operation, with power applied to shaft 10, and with the first speed range utilized, the braking unit 54 is employed to maintain ring gear 52 in a fixed or locked position. Concurrently, and with reference to FIG. 2 of the drawings, the eccentricity or stroke of the hydraulic unit 24 is varied, in a manner to cause the ring gear 32 to rotate in a reverse direction but at a speed less than that which would cause planetary gears 34 and carrier 35 to remain stationary thereby providing a net rotation to planet carrier 35 and therefor to intermediate shaft 36 and sun gear 42. With the ring gear 52 locked by brake 54, the planets 50 revolve to drive gear 56 and gear 58 on the output shaft 60. As the ring gear 32 is slowed by variation of the pump stroke, an increase in the speed of intermediate shaft 36 and the output shaft 60 takes place. By further variation of the stroke of pump 24, the ring gear 32 will slow to a stop and then begin to rotate in the same direction as sun gear 30 thereby adding to the net rotational speed of planet carrier 35 and ultimately reaching the maximum speed applied to the output shaft 60 due to the first speed range. At condition A in FIG. 2, the maximum speed having been reached in the first speed range, the transmission progresses to the second speed range. It is to be appreciated that in transition to the second speed range of the transmission, no abrupt step-up in speed will occur. Again referring to FIG. 1, during the second speed range, the brake 54 is released and brake 68 of the second speed range clutch assembly 44 is applied to the planet carrier 66. At the specific point of transition, as indicated at point A in FIG. 2, the planet gears 62 in assembly 44 will not revolve due to the planet carrier 66 being braked. Therefore, the planet gears 62 will rotate about their individual respective axes in a fixed position and drive ring gear 64 in a direction opposite to intermediate shaft 36.

Ring gear 64 in turn is in driving connection with ring gear 70. The ring gear 70, planet gears 72, and sun gear 74 comprise the second set of gearing. Sun gear 74 is driven at a fixed speed in proportion to the input shaft speed 10 through gears 18, 20, 80, 78, and shaft 75. At point A, the rotational speed of ring gear 70 is subtracting from the net output speed of the planet carrier 76 and necessarily the connected output shaft 60. As the speed of the intermediate shaft 36 is decreased, by appropriate variation of the stroke of pump 24, the speed of the ring gear 70 is decreased which results in an increase in net output speed to the planet carrier 76 and the output shaft 60.

The braking of the ring gear 70 to correspondingly vary the output speed on shaft 60 results in regenerative power being fed back from ring gear 70 to ring gear 64 and ultimately to the ring gear 32. Therefore, in this mode of second speed range operation, the hydraulic unit 26 operates as a pump with respect to the hydraulic unit 24 which acts in response as a motor with respect to unit 26. The hydraulic unit 24 thereby provides an effective transmission of the regenerative power to shaft 22 which in turn transmits the regenerative power to sun gear 74 in order to drive the output shaft 60. There are other occurrences of regenerative conditions within the operative range of the transmission which are not set out in detail.

During the second speed range of operation, maximum output speed on shaft 60 is obtained as the intermediate shaft 36 approaches zero speed as indicated by point B of FIG. 2 of the drawings. As previously described, reduction of the intermediate shaft 36 speed to zero as found in the neutral condition of the transmission, occurs by variation of the capacity of unit 24 to obtain a rotational speed of ring gear 32 equal and opposite to the rotational speed of sun gear 30. This is graphically illustrated in FIG. 2 wherein the pump stroke or capacity of hydraulic unit 24 is at the same points in the neutral position as well as at point B. When top output speed is reached in the second speed range, transition to the third speed range occurs.

During the third speed range of operation, the brake 68 is released and the clutching assembly 69 is employed. The clutch plates 81 engage corresponding plates 65 which extend radially inward from ring gear 64 to which they are attached. Therefore, at point B as considered in FIG. 2, the brake unit 68 is released and the ring gear 64 is clutched to intermediate shaft 36 through the assembly 69. In order to increase the speed of output shaft 60 further, with a fixed input speed on shaft 10, it is necessary to increase the speed of ring gear 70 from zero speed at point B to rotation in the same direction as sun gear 74. In this manner, the ring gear 70 will add to the net output speed of the planet carrier 76 and necessarily the speed of output shaft 60. The foregoing is accomplished through the clutching assembly 69 when the capacity of the hydraulic unit 24 is varied to again reduce the speed of ring gear 32 and thereby impart corresponding net rotation to intermediate shaft 36. It is to be understood that the intermediate shaft 36 rotates in the same direction at the various operational points in the second and third speed ranges. However, during the third speed range of operation, the ring gear 64 is driven in the same rotational direction as the intermediate shaft 36 and effects an additive effect to the rotational output speed of the planet carrier 76 through inneraction with ring gear 70. It can therefore be appreciated that during the second speed range of operation, the ring gear 64 is driven in an opposite rotational direction from intermediate shaft 36 through the reversing effect imparted by the planets 62. As previously mentioned, variation of the speed of the ring gear 64 during second speed range operation variably drives the ring gear 70 to variably subtract from the net output speed of the planet carrier 76 and hence varies the rotational speed of the output shaft 60.

The gear assembly 46 is utilized to provide a reversing mode of operation for the output shaft 60 of the transmission. From a neutral position as described above, the hydraulic pump 24 is varied to impart a rotation to intermediate shaft 36 as described for the initiation of the first speed range operation. Concurrent with the adjustment of unit 24, the braking unit 86 is employed to operate on planet carrier 84 in order to lock the latter in a fixed position. In this manner, the sun gear 40 drives the plaet gears 82 which in turn drive the ring gear 52 in a rotational direction opposite from that of the intermediate shaft 36. In this mode, with properly chosen gear ratios, the planet gears 50 will revolve in the direction of rotation of the ring gear 52 thereby imparting rotation to gear 56 in the same rotational direction as ring gear 52. It can be seen therefore that the rotation of gear 56 in the reverse mode is opposite to its direction of rotation when assembly 48 is employed during the first speed range operation. The direction of rotation of gear 56 is necessarily reflected on the output shaft 60 through gear 58.

It is to be understood, in consideration of the above description, that the prior art contains infinitely variable split-path transmissions. However, with increasing demand in the art for wider ranges of stall torque and drive ratio coverage, the size of the transmission hydraulic devices, in this case the ball-piston pump and motor units, become prohibitively large if the multiple speed ranges of the present invention are not utilized.

In contrast to the two speed ranges mentioned in the U.S. Pat. No. 3,489,036, the present invention provides greater torque multiplication by employing multiple ranges. Unlike the conventional automatic transmission, the shifts in the infinitely variable transmission of the present invention are made at synchronous conditions or, in other words, the overall drive ratio immediately before and after any one shift is the same. This in turn yields the "stepless" quality of an infinitely variable transmission. In addition since each gear ratio uses a different and distinct combination of gears, each gear ratio is distinct and completely independent as illustrated by the different slopes for each range in FIG. 2. Prior art transmissions generally would include two ranges having the same gear ratios but offset in speed by use of an additional input or overdrive. Therefore a principal contribution of this invention is a multirange transmission wherein the gear ratios can be individually engineered in each range (including reverse) to meet requirements of speed, weight, torque, etc.

While there is shown one embodiment of the invention, it is, of course, understood that various modifications may be made therein, and it is intended to cover in the appended claims all such modifications as fall within the true spirit and scope of the invention.

We claim:

1. An infinitely variable hydromechanical transmission providing three synchronously changeable speed ranges, each with a distinct torque ratio between the output of the hydrostatic transmission and the output shaft, comprising:
   a. an input means (1);
   b. an output shaft (60);
   c. an intermediate shaft (36);
   d. a variable speed hydrostatic transmission (2) interposed between said input means (1) and said intermediate shaft (36) whereby said hydrostatic transmission is driven by said input means and said intermediate shaft is driven by said hydrostatic transmission;
   e. selectable reduction gearing means (5) interconnecting said intermediate (36) and output (60) shafts;
   f. a first three-element epicyclic gear set (6) having a first element (38) driven by the intermediate shaft (36), a second element (64) provided with transfer means (67) to drive an element of a second three-element epicyclic gear set and a third element (62, 66) to complete the first epicyclic set;
   g. a second three-element epicyclic gear set (7) having a first element (70) provided with a transfer means (71) driven by said transfer means (67) of said first epicyclic set, a second element (72, 76) connected to said output shaft (60) and a third element (74) connected to said input means (1) by mechanical means (75, 78) for transfer of input torque; and
   h. clutch means (44, 69) operatively connected with said first epicyclic set for
      i. selectively locking the third element (62, 66) of said first set to ground to form a reaction point in said set to employ the gear ratio between the first (38) and the second (64) elements of the first set as reduction gearing between said intermediate shaft (36) and said transfer means (71) of said second epicyclic set,
      ii. selectively locking together two elements of said first set to cause common rotation of all three elements of said first set;
   whereby said first and second epicyclic sets provide two ranges of different torque ratios between said hydrostatic transmission and said output shaft, each of which ratios is different from that provided by said selectable reduction gearing means (5) which provides a third range having a distinct torque ratio.

2. The transmission of claim 1 wherein:
  a. said first three-element epicyclic set (6) comprising a sun gear (38) connected to said intermediate shaft (36), planetary gears (62) supported by carrier (66) and a ring gear (64) carrying a spur gear (67), said sun gear being said first element, said ring gear being said second element, said spur gear being said transfer means and said planetary gears and carrier being said third element;
  b. said second three-element epicyclic set comprising as said first, second and third elements respectively a ring gear (70) having an exterior spur gear (71) meshing with the said exterior spur gear (67) of said first set, planetary gears (72) mounted on a carrier (76) connected to said output shaft (60), and sun gear (74) connected to a shaft (75) comprising a portion of said mechanical means for transfer of input torque; and
  c. said clutch means comprising:
    i. an intermediate range brake (68) for locking said carrier (66) of said first set to ground to provide a reaction means for applying the gear ratio existing between said sun gear (38) and ring gear (64) as a reduction ratio between said intermediate shaft (36) and said second epicyclic set, and
    ii. a high range clutch mechanism (69) for locking said sun gear (38) to said ring gear (64) of said first epicyclic set to cause the common rotation of said three elements of said first set.

3. The transmission of claim 2 wherein said variable speed hydrostatic transmission (2) is connected to said intermediate shaft (36) by means of differential gearing (3) having two inputs (30, 32) and one output (35), said output (35) being connected to said intermediate shaft (36), the first said input (32) being connected to the output of said hydrostatic transmission and the second said input (30) being connected to said input means whereby said hydrostatic transmission is made to operate as a hydromechanical transmission.

4. The transmission of claim 1 wherein said variable speed hydrostatic transmission (2) is connected to said intermediate shaft (36) by means of differential gearing (3) having two inputs (30, 32) and one output (35), said output (35) being connected to said intermediate shaft (36), the first said input (32) being connected to the output of said hydrostatic transmission and the second said input (30) being connected to said input means whereby said hydrostatic transmission is made to operate as a hydromechanical transmission.

5. The transmission of claim 4 wherein said selectable reduction gearing means (5) interconnecting said intermediate (36) and said output (60) shafts comprises a low range gear train (42, 50, 52) driven by said intermediate shaft, a low range clutch (48), a reverse range gear train (40, 82, 52) driven by said intermediate shaft, a reverse range clutch (46), and spur gears (56, 58) connecting the output of said low and reverse range gear trains to said output shaft (60), whereby said reduction gearing means (5) provide low and reverse ranges of different directions along a single distinct torque ratio directly interconnecting said intermediate (36) and output (60) shafts.

6. The transmission of claim 5 wherein:
  a. said low range gear train comprises an epicyclic gear set including a sun gear (42) driven by said intermediate shaft (36), planetary gears (50) attached to one (56) of said spur gears of said reduction gearing means (5) and a ring gear (52);
  b. said reverse range gear train comprises an epicyclic gear set including a sun gear (40) driven by said intermediate shaft (36), planetary gears (82) attached to a carrier (84) and a ring gear (52) which is the same ring gear as the ring gear of the epicyclic set of said low range gear train;
  c. said low range clutch comprises a brake (54) for braking the ring gear (52) of said low range gear train to cause said low range gear train to drive said spur gears (50); and
  d. said reverse range clutch comprises a brake (68) for braking the carrier (84) of the epicyclic set of said reverse range gear train to cause said ring gear to be driven whereby said ring gear in combination with the sun gear motion will drive the planetary gears of the epicyclic set of said low range gear train and said spur gears in a direction reverse of that in which they are driven by the low range gear train.

7. An infinitely variable hydromechanical transmission providing three synchronously changeable speed ranges, each with a distinct torque ratio between the output of the hydraulic device and the output shaft, and a reverse range comprising:
  a. an input means (1);
  b. an output shaft (60);
  c. an intermediate shaft (36);
  d. a variable speed hydromechanical transmission interposed between said input means (1) and said intermediate shaft (36) including:
    i. a variable speed hydrostatic transmission (2) driven by said input means (1), and
    ii. a differential gearing means having a first input (32) driven by said hydrostatic transmission, a second input (30) driven by said input means (1) and an output (35) connected to said intermediate shaft (36) whereby said intermediate shaft is driven by the hydromechanical output of said transmission;
  e. selectable reduction gearing means (5) interconnecting said intermediate shaft (36) and said output shaft (60) including:
    i. a low range gear train comprising a low range epicyclic gear set including a sun gear (42) driven by said intermediate shaft (36), planetary gears (50), and a ring gear (52),
    ii. a reverse range gear train comprising a reverse range epicyclic gear set including a sun gear (40) driven by said intermediate shaft (36), planetary gears (82) attached to a carrier (84) and a ring gear (52) which is common with the ring gear (52) of said low range epicyclic set,
    iii. spur gears (56, 58) driven by said planetary gears (50) of said low range gear train for driving said output shaft (60),
    iv. a low range clutch (48) comprising a brake (54) for braking the common ring gear (52) of said low and reverse range gear trains to cause the sun gear (42) of said low range set to drive the low range planetary gears (50) and said spur gears (56, 58), v. a reverse range clutch (46) comprising a brake (86) for braking the carrier (84) of said reverse range epicyclic set to drive said common ring gear (52) in combination with the sun gear (42) to cause the low range planetary gears (50) and spur gears (56, 58) to be driven in a direction opposite to that in which they are driven in low range, whereby an actuation of said brakes said intermediate shaft (36) may drive said output shaft (60) in either direction;

f. an intermediate and high range gear train (6, 7) comprising:

i. a first three-element epicyclic gear set (6) having a sun gear (38) connected to said intermediate shaft (36), planetary gears (62) attached to a carrier (66) and a ring gear (64) carrying a first torque transfer spur gear (67), ii. a second three-element gear set (7) having a ring gear (70) carrying a second torque transfer spur gear (71) meshing with said first torque transfer spur gear (67), planetary gears (72) mounted on a carrier (76) connected to said output shaft (60) and a sun gear (74) which is connected to a shaft (75) driven by said input means (1), iii. an intermediate range brake (68) for braking the carrier of said first set to cause said sun gear (38) to drive said ring gear (64), said torque transfer spur gears (67, 71), said second epicyclic set (7) and said output shaft (60) whereby said intermediate shaft (36) may drive said output shaft (60) in an intermediate forward range having a distinct torque ratio different from that of said low range, and iv. a high range clutch mechanism for locking together for common rotation the sun (38) and ring (64) gears of said first set to drive said output shaft (60) in a high forward range having torque distinct from that of the other ranges whereby said transmission operates as controlled by the respective clutch mechanisms in one reverse and three forward ranges wherein each forward range has a distinct torque ratio between the output of said hydrostatic transmission and the output shaft.

\* \* \* \* \*